US008499837B2

(12) United States Patent
Koons

(10) Patent No.: US 8,499,837 B2
(45) Date of Patent: Aug. 6, 2013

(54) NANOPARTICLE-DENSIFIED NEWTONIAN FLUIDS FOR USE AS CEMENTATION SPACER FLUIDS AND COMPLETION SPACER FLUIDS IN OIL AND GAS WELLS

(75) Inventor: Brian E. Koons, Fulshear, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 308 days.

(21) Appl. No.: 12/748,629

(22) Filed: Mar. 29, 2010

(65) Prior Publication Data
US 2010/0243236 A1    Sep. 30, 2010

Related U.S. Application Data

(60) Provisional application No. 61/164,525, filed on Mar. 30, 2009.

(51) Int. Cl.
*E21B 43/16* (2006.01)
*E21B 33/13* (2006.01)
*E21B 43/22* (2006.01)

(52) U.S. Cl.
USPC ............... 166/305.1; 166/291; 166/177.4; 166/300

(58) Field of Classification Search
USPC ............ 166/305.1, 293, 294, 291, 296, 300, 166/177.4; 507/928; 977/902
See application file for complete search history.

(56) References Cited

U.S. PATENT DOCUMENTS

| 4,588,032 | A | | 5/1986 | Weigand et al. | |
|---|---|---|---|---|---|
| 5,027,900 | A | | 7/1991 | Wilson | |
| 5,113,943 | A | * | 5/1992 | Wilson et al. | 166/291 |
| 6,626,243 | B1 | * | 9/2003 | Go Boncan | 166/293 |
| 8,056,630 | B2 | * | 11/2011 | Huang et al. | 166/281 |
| 2002/0123431 | A1 | * | 9/2002 | Jimenez et al. | 507/100 |
| 2009/0082230 | A1 | * | 3/2009 | Javora et al. | 507/269 |

OTHER PUBLICATIONS

Li et al., "Emergent Nanostructures: Water-Induced Mesoscale Transformation of Surfactant-Stabilized Amorphous Calcium Carbonate Nanoparticles in Reverse Microemulsions," Advanced Functional Materials, vol. 12 (11-12), pp. 773-779, 2002.
Mahalingam et al., "Directed Self-Assembly of Functionalized Silica Nanoparticles on Molecular Printboards through Multivalent Supramolecular Interactions," Langmuir, vol. 20(26), pp. 11756-11762, 2004.
McNamara et al., "Acetylacetonate Anchors for Robust Functionalization of $TiO_2$ Nanoparticles with Mn(II)—Terpyridine Complexes," vol. 130, pp. 14329-14338, 2008.

* cited by examiner

*Primary Examiner* — Zakiya W Bates
*Assistant Examiner* — Silvana Runyan
(74) *Attorney, Agent, or Firm* — Edward Mickelson; John E. Vick

(57) ABSTRACT

Cement spacer fluids may be densified for use in conjunction with drilling fluids and cement slurries for cementing operations involving oil and gas wells, wherein such densifying is done via the addition of nanoparticles to the spacer fluid. The disclosure is directed to analogous methods of densifying completion spacer fluids using added nanoparticles and to systems for implementing the use of such nanoparticle-containing compositions in well cementing operations.

2 Claims, 1 Drawing Sheet

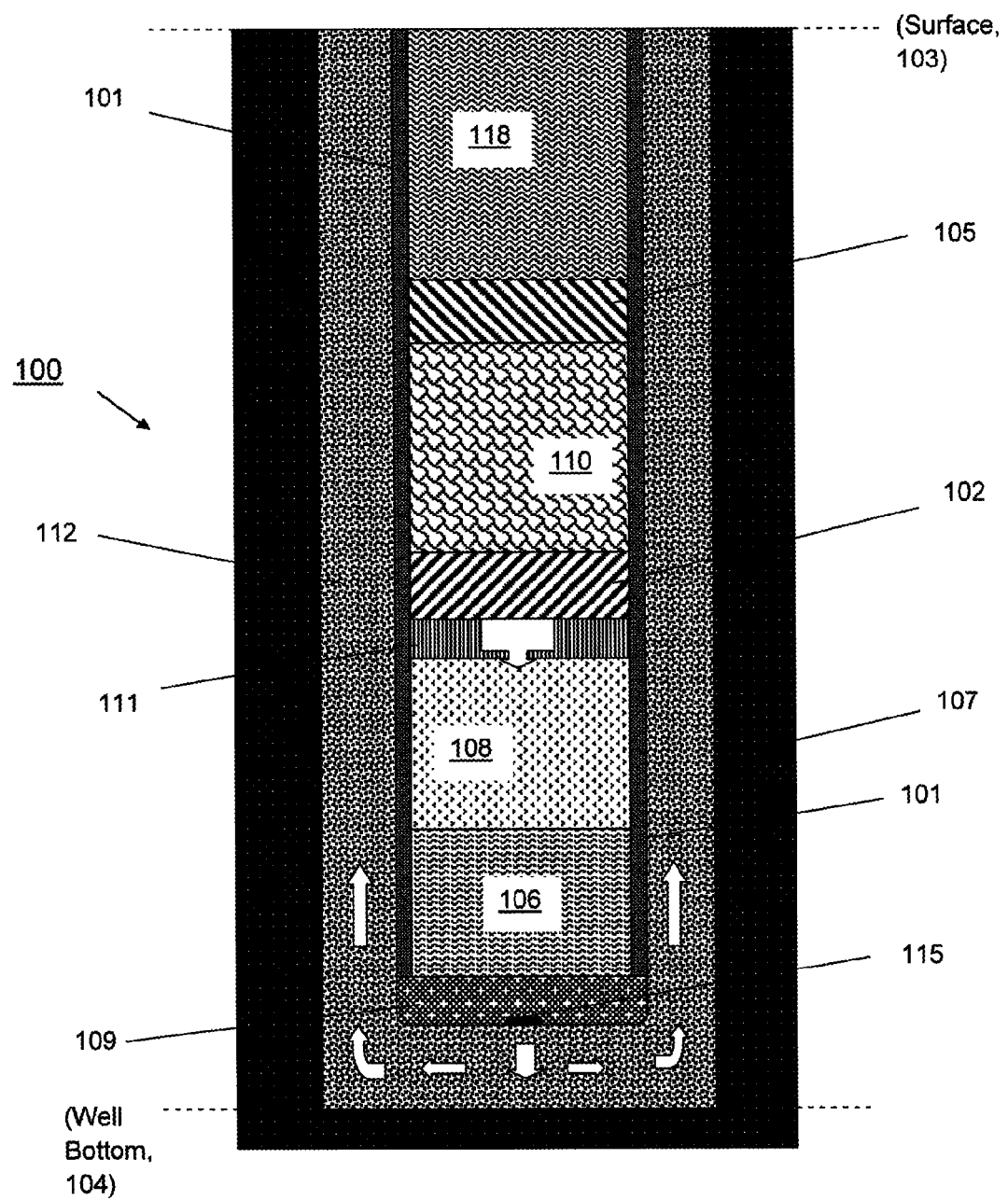

NANOPARTICLE-DENSIFIED NEWTONIAN FLUIDS FOR USE AS CEMENTATION SPACER FLUIDS AND COMPLETION SPACER FLUIDS IN OIL AND GAS WELLS

CROSS-REFERENCE TO RELATED APPLICATIONS

Priority is claimed to commonly-assigned U.S. Provisional Patent Application Ser. No. 61/164,525; filed Mar. 30, 2009.

FIELD OF THE INVENTION

This invention relates generally to oilfield drilling and well completions, and specifically to compositions, methods, and systems for optimizing—through nanoparticle densification—the specific gravity and viscosity of cementation spacer fluids and completion spacer fluids; and also to meet the compatibility parameters of the drilling fluids and cement slurries they are used in conjunction with, while maintaining their Newtonian fluid properties and their ability to be pumped in turbulence.

BACKGROUND

Referring to FIG. 1, and in accordance with some well cementation procedures, a well (e.g., an oil well) 100 is drilled into a formation 107 from a surface (sea floor if an offshore well) 103 to a depth designated as being well bottom 104. Once drilled, the drill string is typically removed, thereby leaving the well filled with drilling fluid. A casing string 101 is then run down well (or hole) 100, thereby establishing annular region 112 between the outer casing wall and formation 107. Typically, a guide shoe 109 and centralizer (not shown) are attached to the bottom of casing string 101. Guide shoe 109 generally comprises an orifice 115 from which fluids flowing down the interior of casing string 101 can emanate and flow back up through annular region 112. Additionally, a float collar 111 can be positioned in casing string 101 near the well bottom to inhibit fluid flow back up the interior of the casing string.

Still referring to FIG. 1, drilling fluid present when the well is cased can be displaced using a drilling fluid 106 (or other suitable displacement fluid) passed down casing string 101, through float collar 111 and guide shoe orifice 115, and up annular region 112. Because cement slurries are typically incompatible with drilling fluids, the drilling fluid 106 can be followed by a spacer fluid 108 during a cement job. Note that turbulent "spacer(s)" are sometimes pumped with laminar spacer(s), such spacer combinations often being referred to as "spacer trains."

With continued reference to FIG. 1, following the spacer fluid, a cement slurry 110 (sometimes pumped with a "lead slurry" and a "tail slurry") is introduced down the casing string between a penetrable/rupturable bottom plug 102 and a solid top plug 105. Following the top plug 105, a displacement fluid 118 (e.g., drilling fluid), sometimes being preceded by a spacer fluid, forces the bottom plug/cement slurry/top plug system down casing string 101 until the bottom plug reaches float collar 111, at which point bottom plug 102 ruptures and cement slurry 110 flows through float collar 111, out orifice 115, and up annular region 112 until top plug 105 lands on bottom plug 102 (signaled by a rise in pressure). Note that those of skill in the art will appreciate that a high degree of variability exists in the above description of well cementation (e.g., multiple bottom plugs, graduated fluid densities, etc.), and that the description above should not be seen as limiting the scope of the invention described hereinafter (vide infra).

Further regarding the incompatibility issues mentioned above, cement slurries are, more often than not, chemically incompatible with drilling fluids. In fact, the mixing of such incompatible fluids can result in a highly-viscous, highly-gelled mixture that can be difficult, if not impossible, to displace from a well. To prevent intermixing of incompatible combinations of drilling fluids and cement slurries in a well, spacer fluids have long been used to mitigate against such intermixing. See, e.g., Weigand et al., U.S. Pat. No. 4,588,032; and Wilson et al., U.S. Pat. No. 5,113,943.

The primary requirement for cement spacer fluids is that they be compatible with both the drilling fluid and the cement slurry that they are used in conjunction with. Additionally, the spacer fluids should possess certain rheological tendencies, such as turbulent flow at lower shear rates, which assist in granular solids removal and which encourage the removal of the drilling fluid filter cake from the walls of the well. Turbulent flow is generally regarded as the most effective method for well cleaning during cementing operations.

Conventional cement spacers are typically composed of an aqueous base fluid and a densification agent. Other components can include, for example, one or more of the following: anti-settling agents, dispersal agents, fluid loss controlling agents, viscosifying agents, and the like. For aqueous-based spacer fluids, all of such one or more additional components should be soluble and/or dispersible in water. Furthermore, in some instances a single component additive may impart a plurality of properties to the resulting fluid mixture.

The density (or weight) of a cement spacer fluid should be variable and will typically be adjusted according to well control and compatibility parameters associated with the particular drilling fluid and cement slurry with which it is associated. In some instances, where there is a density mismatch between the drilling fluid and the cement slurry, the spacer fluid is densified such that it is intermediate between that of the drilling fluid and the cement slurry. Additionally, the density of the spacer fluid can be graduated to better match the densities of the fluids between which it is interposed. See, e.g., Wilson, U.S. Pat. No. 5,027,900. For turbulent flow, the density of the cement spacer fluid is typically limited to ~10 pounds per gallon (ppg) using traditional densification methodologies (e.g., saturated NaCl brine).

Cement slurries are typically more viscous than the drilling fluids preceding them in a given cement job, and spacer fluids have historically had viscosities that are typically intermediate to that of the drilling fluid and cement slurry they are used in conjunction with, wherein the relatively high viscosity of such spacers generally requires that they be pumped under laminar flow. The viscosity of the cement slurry is also largely a function of the various components added thereto. To retain the desired rheological properties and permit turbulent cleaning of the well, such spacer fluids should generally have a relatively low viscosity (e.g., ~5 centipoise (cP) or less).

Historically, cement spacers have been densified by adding viscosifying agents and/or non-soluble weighting agents to fresh water, seawater, brines, or other aqueous or non-aqueous base spacer fluids (higher viscosity is needed to support the dispersion of the weighting agents). The resulting fluids, however, are either high viscosity Newtonian fluids, Bingham plastic fluids, power law fluids, or modified Hershel-Bulkely fluids—all of which are incapable of being placed in turbulent flow, at achievable rates, around the entire annular region.

Accordingly, such fluids must be pumped in laminar flow to maintain well control and effective cementation of the annular space.

In view of the foregoing, a method or system for easily densifying a cement spacer fluid (e.g., to ~10 ppg or more), while keeping the fluid Newtonian and pumpable under turbulence, would be extremely useful.

BRIEF DESCRIPTION OF THE INVENTION

The present invention is directed to methods for densifying cement spacer fluids for use in conjunction with drilling fluids and cement slurries for cementing operations involving oil and gas wells, wherein such densifying is done via the addition of nanoparticles to the cement spacer fluid. The present invention is also directed to analogous methods of densifying completion spacer fluids using nanoparticles, to Newtonian fluid compositions resulting from any such fluid densification, and to systems for implementing the use of such compositions in well cementing operations.

In some embodiments, the present invention is directed to a cement spacer composition for separating drilling fluid and cement slurry from one another during a cementing procedure, wherein said composition can be placed under turbulent flow, and wherein said composition comprises: (a) a base fluid; and (b) a plurality of nanoparticles, wherein the nanoparticles: (i) are inert with respect to the drilling fluid and the cement slurry; (ii) possess a mean diameter in the range of from about 1 nm to about 100 nm in at least two dimensions; (iii) are dispersible or otherwise suspendable in the base fluid; and (iv) are operable for densifying the resulting cement spacer composition; wherein the resulting weight of said composition is a function of the size of the nanoparticles, the quantity of nanoparticles, and the specific gravity of the nanoparticles; and wherein the resulting cement spacer composition is a Newtonian fluid that can be pumped under turbulence.

In some embodiments, the present invention is directed to a method for densifying a cement spacer fluid, said cement spacer fluid usable in conjunction with a drilling fluid and a cement slurry for cementing a casing string in a wellbore, said method comprising the steps of: (a) selecting a quantity of nanoparticles on the basis of their specific gravity (density) and inertness in relation to corresponding requirements for a particular application; and (b) dispersing the quantity of nanoparticles in a volume of cement spacer fluid so as to provide for a densified cement spacer fluid, wherein said densified cement spacer fluid is compatible with both of the drilling fluid and the cement slurry, and wherein the densified cement spacer fluid is Newtonian and can be pumped under turbulence.

In some embodiments, the present invention is directed to a method for densifying a completion spacer fluid for use in oil and gas well completions, said method comprising the steps of: (a) selecting a quantity of nanoparticles on the basis of their specific gravity and inertness in relation to corresponding requirements for a particular application; and (b) dispersing the quantity of nanoparticles in a volume of completion spacer fluid so as to provide for a densified completion spacer fluid, wherein the densified completion spacer fluid is Newtonian and can be pumped under turbulent flow.

In some embodiments, the present invention is directed to a system for cementing casing in an oil or gas well, the system comprising: (a) a casing string disposed within a wellbore, the wellbore having been established in a formation; (b) an annular region existing between the casing exterior and the formation, into which a cement slurry will be introduced and allowed to cure; (c) a means for pumping fluids down the casing string interior, out an orifice near the well bottom, and up the annular region; (d) drilling fluid; (e) a cement slurry; and (f) a Newtonian cement spacer fluid densified with nanoparticles to about 10 pounds per gallon (ppg) or more, wherein the cement spacer fluid can be pumped in the well under turbulent conditions.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawing, in which:

FIG. 1 illustrates a well cementation procedure, consistent or otherwise in accordance with at least some embodiments of the present invention.

DETAILED DESCRIPTION OF THE INVENTION

1. Introduction

This invention is directed to methods for densifying cement spacer fluids (and completion spacer fluids) using nanoparticles as densifying or weighting agents. Because such nanoparticles can be dispersed in fluids of low viscosity, such cement spacer fluids can be densified without having to add additional viscosifying agents. This permits cement spacer fluids to be made with relatively high densities (e.g., 10 pounds per gallon (ppg) or more), while maintaining the fluid's Newtonian character. A great advantage of such nanoparticle-densified cement spacer fluids of the present invention is that they can be pumped under turbulent flow, thereby permitting the effective wellbore cleaning described above. The present invention is also directed to systems for implementing such methods, systems for utilizing such methods, and to novel compositions resulting therefrom.

2. Definitions

Certain terms are defined throughout this description as they are first used, while certain other terms used in this description are defined below:

The term "nanoscale," as defined herein, refers to dimensional attributes of 100 nm ($10^{-9}$ m) or less.

A "nanoparticle," as defined herein, is a three-dimensional object, wherein at least two of said dimensions are nanoscale.

3. Compositions

In some embodiments, the present invention is directed to a cement spacer composition for separating drilling fluid and cement slurry from one another during a cementing procedure, wherein said composition can be placed under turbulent flow, and wherein said composition comprises: (a) a base fluid; and (b) a plurality of nanoparticles, wherein the nanoparticles: (i) are inert with respect to the drilling fluid and the cement slurry; (ii) possess a mean diameter in the range of from about 1 nm to about 100 nm in at least two dimensions; (iii) are dispersible or otherwise suspendable in the base fluid; and (iv) are operable for densifying the resulting cement spacer composition; wherein the resulting weight of said composition is a function of the size of the nanoparticles, the quantity of nanoparticles, and the specific gravity of the nanoparticles; and wherein the resulting cement spacer composition is a Newtonian fluid that is capable of being pumped under turbulence.

In some such above-described compositional embodiments, said cement spacer composition has a viscosity of not more than about 30 cP. In some such embodiments, said cement spacer composition has a viscosity of not more than about 15 cP. In some such embodiments, said cement spacer composition has a viscosity of not more than about 5 cP.

In some such above-described compositional embodiments, said cement spacer composition further comprises a dispersal agent operable for dispersing the nanoparticles in the base fluid. In some such embodiments, the dispersal agent is a surfactant selected from the group consisting of ionic surfactants (e.g., sodium dodecyl sulfate and cetyl trimethylammonium bromide), non-ionic surfactants (e.g., TRITON X-100®, PLURONICS®), and combinations thereof. Such dispersal agents may also serve to keep the nanoparticles suspended in the fluid, e.g., as a stable suspension. For examples of how surfactants can be used to assist in the dispersal of nanoparticles, see Li et al, "Emergent Nanostructures: Water-Induced Mesoscale Transformation of Surfactant-Stabilized Amorphous Calcium Carbonate Nanoparticles in Reverse Microemulsions," Advanced Functional Materials, vol. 12 (11-12), pp. 773-779, 2002.

In some such above-described compositional embodiments, said cement spacer composition further includes a surfactant and/or mutual solvent to aid in the removal and cleaning of a non-aqueous drilling fluid to create a "water-wet" environment for the placement of the cement slurry/slurries.

In some such above-described compositional embodiments, the base fluid is water. In such embodiments, the cement spacer fluid is termed, "aqueous." Alternatively, and depending on the nature of the drilling fluid(s) and cement slurry/slurries it is used in conjunction with, the base fluid can be non-aqueous (e.g., an alcohol or other hydrocarbon).

In some such above-described compositional embodiments, the nanoparticles are selected from the group consisting of metals, alloys, polymers, ceramics, mixed-matrix compositions, nanospheres, nanotubes, nanorods, and coated and non-coated combinations thereof. Possible nanoparticle compositions include, but are not limited to, iron oxide ($Fe_2O_3$), cerium oxide ($CeO_2$), lanthanum oxide ($La_2O_3$). aluminum oxide ($Al_2O_3$), titania ($TiO_2$), barium sulfate ($BaSO_4$), and the like. Note that the manufacture of such nanoparticles is not particularly limited, and that a wide variety of nanoparticles are commercially available and manufactured with a variety of techniques.

In some such above-described compositional embodiments, the nanoparticles may possess unique physical and/or chemical properties by virtue of their nanoscale dimensions. Quantum confinement, for example, can result when a particle's dimensions drop below their Bohr exciton radius.

In some such above-described compositional embodiments, at least some of the nanoparticles are chemically-functionalized. For examples of nanoparticle chemical-functionalization, see Mahalingam et al., "Directed Self-Assembly of Functionalized Silica Nanoparticles on Molecular Printboards through Multivalent Supramolecular Interactions," Langmuir, vol. 20(26), pp. 11756-11762, 2004; and McNamara et al., "Acetylacetonate Anchors for Robust Functionalization of $TiO_2$ Nanoparticles with Mn(II)—Terpyridine Complexes," vol. 130, pp. 14329-14338, 2008. Note that chemical functionalization can be used to improve nanoparticle dispersibility, render nanoparticles chemically-inert, and to modify the nanoparticles' physical and/or chemical properties.

In some such above-described compositional embodiments, the composition is weighted (densified) to 10 ppg or more. In some or other embodiments, the composition is weighted to 11 ppg or more. In some or still other embodiments, the composition is weighted to 12 ppg or more.

In some such above-described compositional embodiments, salts such as NaCl or KCl may be used in the spacer to address formation compatibility. This can be particularly important in preventing the swelling of clays in shale formations drilled with non-aqueous drilling fluids. NaCl may be used up to 36% by weight of water (BWOW), whereas KCl is typically used in 3-7% BWOW concentrations.

In some such above-described compositional embodiments, nanoparticles comprise at least about 0.1 wt. % of the composition and at most about 60 wt. % of the composition. In some or other embodiments, nanoparticles comprise at least about 0.1 wt. % of the composition and at most about 40 wt. % of the composition. In some or still other embodiments, nanoparticles comprise at least about 0.5 wt. % of the composition and at most about 30 wt. % of the Composition.

In addition to the selection criteria described (or otherwise inferred) above, selection of suitable nanoparticles may also be influenced by economic considerations. Safety (e.g., toxicity) and environmental factors can also play a significant role in the selection of nanoparticles for the above-described compositional embodiments.

4. Methods

Generally, methods of the present invention are directed to the use of the above-described compositions in well cementing procedures, and to methods of making such compositions, i.e., methods of densifying cement spacer fluids for better performance in cementing operations.

In some embodiments, the present invention is directed to a method for densifying a cement spacer fluid, said cement spacer fluid usable in conjunction with a drilling fluid and a cement slurry for cementing a casing string in a wellbore, said method comprising the steps of: (a) selecting a quantity of nanoparticles on the basis of their specific gravity and inertness in relation to corresponding requirements for a particular application; and (b) dispersing the quantity of nanoparticles in a volume of cement spacer fluid so as to provide for a densified cement spacer fluid, wherein said densified cement spacer fluid is compatible with both of the drilling fluid and the cement slurry, and wherein the densified cement spacer fluid exhibits Newtonian behavior.

In some such above-described method embodiments, the densified cement spacer fluid is densified (weighted) to 10 ppg or more. In some or other embodiments, the densified cement spacer fluid is densified to 11 ppg or more. In some or still other embodiments, the densified cement spacer fluid is densified to 12 ppg or more.

In some such above-described method embodiments, wherein the densified cement spacer fluid can be pumped under turbulent flow. As mentioned above, turbulent flow of the spacer fluid is highly desirable for efficient well cleaning during cementing operations.

5. Variations

As a noteworthy variation on the above-described method embodiments, in some embodiments, the present invention is directed to a method for densifying a completion spacer fluid for use in oil and gas well completions, said method comprising the steps of: (a) selecting a quantity of nanoparticles on the basis of their specific gravity and inertness in relation to corresponding requirements for a particular application; and (b) dispersing the quantity of nanoparticles in a volume of completion spacer fluid so as to provide for a densified completion spacer fluid, wherein the densified completion spacer fluid is a Newtonian fluid, and wherein the densified completion spacer fluid can be pumped under turbulent flow.

In some such above-described variant method embodiments, the densified completion spacer fluid is weighted to at least 10 ppg. Depending on the base fluid, such weighting (densification) can result in densified completion fluids, wherein nanoparticles comprise at least about 0.1 wt. % of the composition and at most about 60 wt. % of the composition.

6. Systems

Generally, systems of the present invention are directed to implementing the above-described methods while utilizing the above-described compositions. Accordingly, they are generally consistent with the aforementioned compositional and method embodiments (vide supra).

In some such embodiments, the present invention is directed to a system for cementing casing in an oil or gas well, the system comprising: (a) a casing string disposed within a wellbore, the wellbore having been established in a formation; (b) an annular region existing between the casing exterior and the formation, into which a cement slurry will be introduced and allowed to cure; (c) a means for pumping fluids down the casing string interior, out an orifice near the well bottom, and up the annular region; (d) drilling fluid; (e) a cement slurry; and (t) a cement spacer fluid in accordance with any of the compositional embodiments described above in section 3.

7. Summary

The preceding description describes novel compositions, methods, and systems for densifying cement spacer fluids with nanoparticles, such resulting densified spacer fluids being used (or operable for use) in cementing operations involving oil and gas wells. Whereas particulate weighting agents with sizes larger than nanoscale typically require viscous fluids (e.g., >5 cP) to maintain them in suspension, nanoparticles can be dispersed in considerably less viscous fluids. The nanoparticle-densification of such spacer fluids allows for densification to levels of 10 ppg or greater—while maintaining the fluid's Newtonian character. Additionally, because such fluids can be pumped under turbulence, efficient well cleaning can be provided by said fluid.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed:

1. A method for densifying a cement spacer fluid, said cement spacer fluid being usable in connection with a drilling fluid and a cement slurry for cementing a casing string in a wellbore, the method comprising the steps of:
   a) selecting a quantity of lanthanum oxide nanoparticles on the basis of specific gravity and inertness in relation to corresponding requirements for a particular application,
   b) dispersing the quantity of lanthanum oxide nanoparticles in a volume of cement spacer fluid so as to provide for a densified cement spacer fluid,
   wherein said densified cement spacer fluid is compatible with the drilling fluid and the cement slurry, and wherein the densified cement spacer fluid is capable of being pumped under turbulent flow.

2. A system for cementing casing in an oil or gas well, the system comprising;
   a) a casing string disposed within a wellbore, the wellbore having been established in a formation;
   b) an annular region existing between the casing exterior and the formation, into which a cement slurry will be introduced and allowed to cure;
   c) a pumping means for pumping fluids down the casing string interior, out an orifice near the well bottom, and up the annular region;
   d) drilling fluid;
   e) a cement slurry; and
   f) a cement spacer fluid, said cement spacer fluid comprising:
      i) a base fluid; and
      ii) a plurality of lanthanum oxide nanoparticles which:
         i) are inert with respect to the drilling fluid and the cement slurry;
         ii) possess a mean diameter in the range of from about 1 nm to about 100 nm in at least two dimensions;
         iii) are dispersible or otherwise suspendable in the base fluid; and
         iv) are operable for densifying the resulting cement spacer composition; wherein the resulting weight of said composition is a function of the size of the lanthanum oxide nanoparticles, the quantity of lanthanum oxide nanoparticles, and the specific gravity of the lanthanum oxide nanoparticles; and wherein the resulting cement spacer composition is a Newtonian fluid.

* * * * *